March 8, 1938. W. D. BELL 2,110,319
SCREEN STENCIL AND METHOD OF MAKING THE SAME
Filed July 22, 1935 3 Sheets-Sheet 1

INVENTOR.
William D. Bell.
BY Corbett + Mahoney
ATTORNEYS.

March 8, 1938. W. D. BELL 2,110,319
SCREEN STENCIL AND METHOD OF MAKING THE SAME
Filed July 22, 1935 3 Sheets-Sheet 2

INVENTOR.
William D. Bell.
BY Corbett + Mahoney
ATTORNEYS.

March 8, 1938.   W. D. BELL   2,110,319
SCREEN STENCIL AND METHOD OF MAKING THE SAME
Filed July 22, 1935   3 Sheets-Sheet 3

INVENTOR.
William D. Bell.
BY Corbett & Mahoney
ATTORNEYS.

Patented Mar. 8, 1938

2,110,319

UNITED STATES PATENT OFFICE 2,110,319

SCREEN STENCIL AND METHOD OF MAKING THE SAME

William D. Bell, Columbus, Ohio, assignor, by mesne assignments, to Solar Laboratories, Beaver, Pa., a corporation of Pennsylvania Application July 22, 1935, Serial No. 32,530

14 Claims. (Cl. 41—38.6)

My invention relates to screen stencils and method of making the same. It has to do, more particularly, with a method for making screen stencils of the type employed in processes for printing on glass and other ceramic articles or posters and other articles, and wherein the paint or other printing material is forced through the open mesh of the screen by means of a squeegee or the like which wipes over the screen. More specifically, it relates to a method of producing stencils on silk or other cloth screens by means of a photographic process.

In the prior art, a number of photographic processes for producing stencils on silk screens have been devised but none of these have proven commercially practicable. With such methods employed in the past, it is customary to paint the gelatin or other sensitized material on the screen in order to produce a light-sensitive film thereon. It is difficult to prepare the gelatinous mixture and to apply it properly to the screen. Another disadvantage of prior art methods has resided in the fact that the screen stencils produced thereby are not very durable. It is necessary for the gelatin film which is applied to the screen to be fairly tough so that it will not be readily broken off by the wiping action of the squeegee. In the past, when the sensitized film on the screen was exposed to the light, due to the fact that the silk threads of the screen are not very translucent, the light rays would not penetrate to the portion of the gelatin film disposed on the other side of the screen. Consequently, the portion of the gelatin film on the side opposite to that from which the light rays travel would not be hardened sufficiently by the light rays and would tend to crack and break off. Furthermore, these prior art methods were quite complicated and difficult to perform.

One of the objects of my invention is to provide a method for producing screen stencils which is very simple and which may be easily and efficiently performed.

Another object of my invention is to provide a method for producing screen stencils by a photographic process which is of such a nature that the stencils produced will be very sturdy and will withstand wear.

In its preferred form my invention contemplates the provision of a method for producing stencils on silk screens wherein the screen is first treated with a substance which makes the silk threads thereof more translucent in order that the light may effectively pass through the threads. A light sensitized film of gelatin or the like is then applied to the silk screen. This film is applied by placing on the screen a photogravure tissue which embodies a gelatin film carried by a paper backing. The gelatin film is placed against the silk screen and is softened by a steaming and ironing process in such a manner that the silk threads will be completely embedded in the gelatin film. The screen is then placed in a bath of a sensitizing solution so that the gelatin film will be rendered sensitive to light. The paper backing of the photogravure tissue is then stripped off leaving the gelatin film in position on the screen. A proper contact negative of the design to be produced on the stencil is then placed over the screen and a light is properly positioned relative to the screen to cause the light rays to pass through the translucent portions of the contact negative and the corresponding portions of the sensitized film carried by the screen. Then the screen is subjected to a developing operation which removes the portions of the film not affected by the light rays. Thus, a screen stencil is produced which has the mesh of portions thereof closed by the gelatin film and the mesh of other portions thereof open so that printing material may be forced therethrough. The step of treating the silk screen so as to make the threads thereof translucent is important because when this is done the light rays will pass through the silk threads themselves so that the light rays will penetrate to the portion of the gelatine film disposed beneath said threads on the side opposite to that where the light source is positioned. Consequently, even the portions of the film below the threads will be hardened and will firmly adhere to the silk screen.

In the accompanying drawings I have illustrated the various steps which I preferably use in performing my method. In the drawings similar characters of reference designate corresponding parts and:

Figure 1:
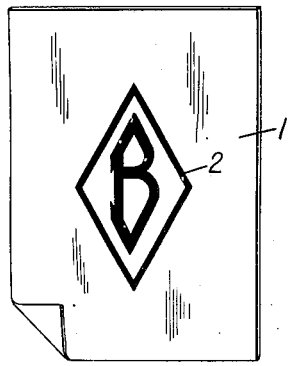
Figure 1 is a view of a contact negative which may be used in my process.

With reference to the drawings, I have illustrated the various steps which I preferably employ in my method. As illustrated in Figure 1, I first provide a contact negative 1 which has the design 2 thereon which is to be formed on the screen stencil. The main portion of the negative 1 is translucent while the design portion 2 thereof is opaque. This contact negative may be prepared by first making a black and white sketch, producing a negative therefrom by a photographic process and then producing from said negative a positive or contact negative. However, the contact negative may be produced in other ways.

Figure 2:
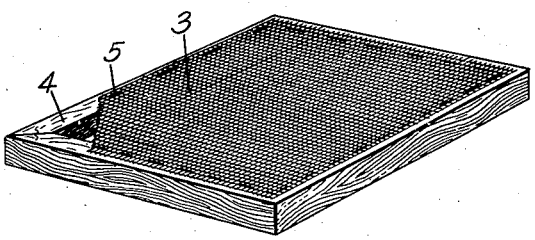
Figure 2 is a perspective view of a silk screen carried by a suitable frame.

I next prepare a silk screen as illustrated in Figure 2. This silk screen 3 embodies a piece of silk fabric which is tautly stretched on a wooden frame 4 and is suitably secured thereto along the margins of the cloth by means of staples 5, or in any other suitable manner.

Figure 3:
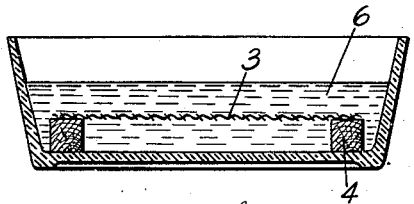
Figure 3 shows the silk screen of Figure 2 in position in a bath of liquid which is adapted to soak into the threads of the screen and to render them more translucent.

I next take the silk screen 3 and place it in a bath 6, as illustrated in Figure 3. This bath consists of a liquid mixture which will soak into the threads of the screen and render them more translucent. The mixture must be thin enough so that it will soak into the threads but will not clog up the mesh of the cloth. For this purpose I have found that a mixture of Canada balsam and xylene is very suitable. The xylene is used to thin the Canada balsam to such an extent that it will penetrate the threads but will not clog up the mesh. When the screen is removed from this bath and allowed to dry, the xylene will evaporate leaving the threads impregnated with the Canada balsam which will render them translucent. Although I have found that this mixture is very satisfactory for the purpose of rendering the threads translucent, other substances may be used for this purpose. However, any substance which is used for this purpose must not be solvent in any liquids used in subsequent steps in the process. I have found that Canada balsam is suitable where the stencil is to be used with vitreous paints in printing on ceramic articles, since alcohol or oils used as a carrier in the paints, will not dissolve the Canada balsam. Instead of placing the screen in a bath of this mixture, the mixture may be applied to the screen merely by painting it on.

Figure 4:
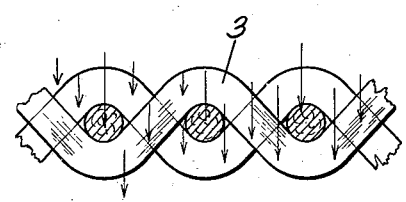
Figure 4 is an enlarged detail in section, taken through the silk screen and illustrating by the arrows how the light rays will pass through the silk threads.

In Figure 4, I have shown an enlarged sectional detail of a portion of the silk screen. The arrows indicate how light rays will pass through the threads of the screen after they have been made translucent by the Canada balsam.

Figure 5:
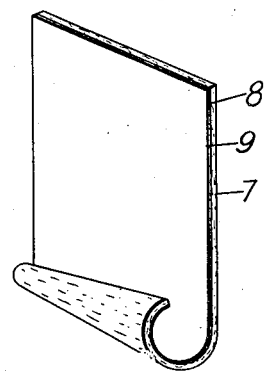
Figure 5 is a view illustrating a photogravure tissue which may be employed in my process.

In Figure 5, I show a photogravure tissue 7 which I preferably use in my process. This tissue 7 comprises a gelatin film 8 which is carried by a paper backing 9. The film 8 may be of other suitable material. It may be a film of any substance which may be treated to render it sensitive to light and which may then be developed. The gelatin film is adapted to be applied to the silk screen and the paper backing removed in a manner to be described hereinafter.

Figure 6:
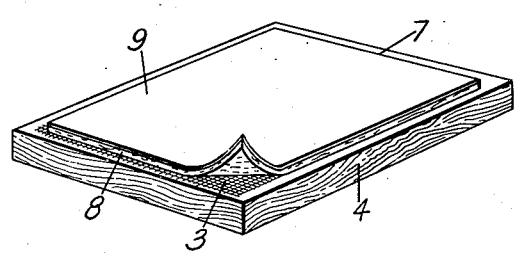
Figure 6 is a perspective view of the screen showing the photogravure tissue positioned thereon with the gelatin film in contact with the silk screen.

In the following description I shall refer to the two sides of the screen 3. The uppermost side of the screen illustrated in Figures 2 and 6 is the side which will come into contact with the work during the printing operation. Therefore, I shall call this side the "work side". The other side, when used in a printing operation, has the paint placed thereon and a squeegee wipes over this side to force the paint through the screen. Therefore, I shall term this side the "squeegee side" of the screen.

In Figure 6, I illustrate how the photogravure tissue is placed on the screen. It is positioned on the screen with the gelatin film 8 in contact with the work side of the screen and with the paper backing 9 uppermost. The tissue is then subjected to a steaming and ironing operation in order to cause the gelatin film to be softened and the threads of the screen to be firmly embedded therein and the film to be firmly secured to the screen.

Figure 7:
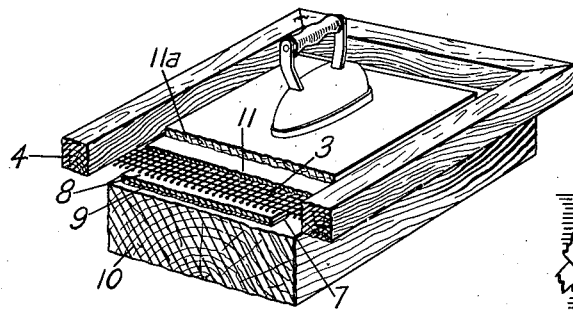
Figure 7 is a view partly in section and partly in perspective illustrating the operation of steaming and ironing the gelatin film on the silk screen.
Figure 8:
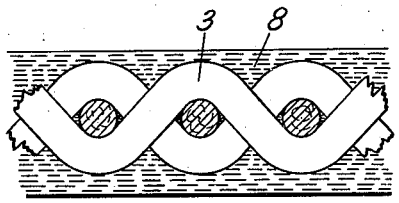
Figure 8 is an enlarged section showing how the threads of the silk screen will be completely embedded in the gelatin film.

One way in which this may be done is illustrated in Figure 7. The screen is turned over and placed on a block 10 of a suitable size. A wet absorbent paper 11 or cloth is placed over the screen on the squeegee side thereof. A blotter 11a is placed above the paper 11 to confine the steam. The heated iron is then placed on the blotter, as indicated. This ironing and steaming process causes the gelatin to soften sufficiently for the threads of the screen to sink into the film and to become completely embedded in the gelatin film. Thus, as illustrated in Figure 8, after the ironing and steaming process, the threads of the screen will be completely enclosed by the gelatin film. The paper 11 is preferably removed while the film is hot so that it will not stick thereto.

Figure 9:
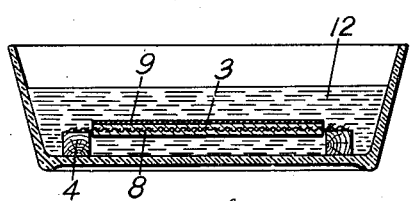
Figure 9 is a view illustrating how the screen with the film thereon is then placed in a light-sensitizing solution.

The next operation is to sensitize the gelatin film. This is done by placing the screen in a bath 12, as illustrated in Figure 9, which contains a suitable sensitizing solution. I have found that a sensitizing solution consisting of 1⅛ ounces of potassium bichromate to 1 gallon of water is very suitable, although other sensitizing solutions may be employed. The bath preferably has a temperature of about 65° F. and the screen is preferably left in the bath for a period of about 2½ to 3 minutes. The sensitizing operation and subsequent operations are performed in a dark room.

Figure 10:
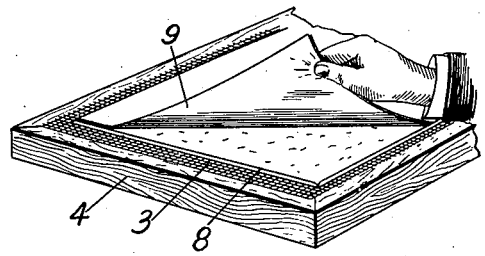
Figure 10 is a perspective view illustrating how the paper backing is removed from the gelatin film.

After the screen has been in the bath for a sufficient length of time, it is removed. Then, as illustrated in Figure 10, the paper backing 9 is stripped from the gelatin film 8. This leaves the gelatin film 8 on the screen which is firmly attached thereto. In fact, the gelatin film really becomes part of the screen.

Figure 11:
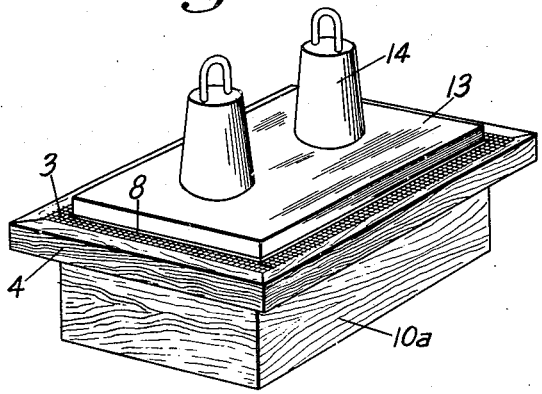
Figure 11 is a view illustrating how a ferrotype plate may be placed against the surface of the gelatin film and weighted downwardly thereagainst in order to produce a smooth glossy finish on the working surface of the film.

The next operation is illustrated in Figure 11 and is adapted to make the gelatin on the work side of the screen smooth and glossy. This is accomplished by taking a ferrotype tin plate 13 and polishing one surface of the plate with a mixture of paraffin and benzene or other suitable substance. The polished surface of the plate is placed in contact with the work side of the screen and the film is squeegeed into perfect contact with the plate from the opposite side of the screen. A block 10a is then positioned beneath the screen and fits within the frame thereof and weights 14 are placed on top of the plate 13. The plate with the weights thereon is then left in contact with the screen for a suitable length of time. When the plate is removed, the work side of the screen will be very glossy and very smooth. This operation also serves to prevent the gelatin film from buckling while the gelatin film, which is wet with the sensitizing solution, is drying. It also makes the gelatin film more compact and more durable.

Figure 12:
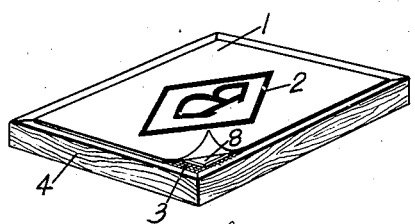
Figure 12 is a perspective view of the screen showing the contact negative of Figure 1 in position on the screen.
Figure 13:
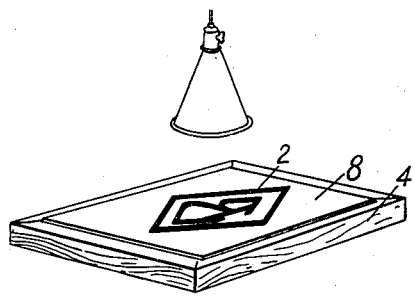
Figure 13 is a view illustrating how the portions of the gelatin film below the translucent portions of the contact negative may be exposed to light.

The next operation is to expose the sensitized gelatin film through the contact negative 1 of Figure 1. As shown in Figure 12, the contact negative 1 is placed over the work side of the screen in contact with the sensitized film carried thereby. Then, as shown in Figure 13, the sensitized film is exposed through the negative. The negative is placed on the work side and the light is positioned on the work side of the screen in order that the design produced in the film carried by the screen will have the sharper edges on the side of the screen which will be disposed adjacent the work. In other words, the light is passed through the screen from the work side and will be more intense on that side and, therefore, the sharper edges will be on the work side. This is advantageous because it will result in better and sharper designs being imprinted on the article to which the design is to be applied.

It will be apparent that the light rays will pass through the greater portion of the negative since it is translucent but will not pass through the design portion 2 thereof since it is opaque. The portion of the gelatin film carried by the screen which is below the design portion will not be exposed. The screen is exposed to a suitable light for a length of time sufficient to cause suitable hardening of the gelatin. The length of exposure is determined by several factors, such as density of the negative, nature of the sensitizer and the intensity of the light.

Figure 14:
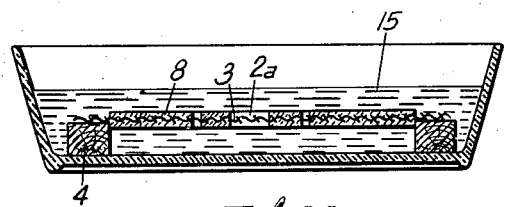
Figure 14 is a view illustrating the screen, after it has been exposed, in position in a developing bath which develops the gelatin film and removes those portions not subjected to the light rays.

After exposure, the negative is removed from the screen and the screen is then placed in a developing bath 15, as illustrated in Figure 14. The screen is preferably first placed in a bath of cold water and allowed to soak for about 2 minutes. The unexposed portions of the gelatin film will absorb the water and swell. The screen is then washed with hot water which will dissolve out the unexposed portions of the gelatin film and leave only the exposed portions of the film on the screen.

Because of the fact that the threads of the screen are made translucent by the treatment previously described, during exposure of the screen to the light rays, the rays will pass more readily through the threads themselves so that the gelatin disposed beneath the threads will also be exposed to the light rays. This will cause even the portions of the gelatin film beneath the threads to be firmly secured to the screen. Thus, the portion of the gelatin film on the work side of the screen will not only be firmly secured to the screen but also the portion of the film on the squeegee side of the screen will be firmly secured to the screen. This is important because the gelatin film on the squeegee side of the screen must be strong and durable and securely attached to the threads of the screen in order that the gelatin film will not crack and break off during the wiping action of the squeegee on the screen. Also, because the film on the squeegee side of the screen is properly exposed, it will more readily withstand wear.

It will be apparent that the thickness of the gelatin film remaining on the screen may be governed by varying the time of exposure. If the film is exposed for only a short period, the light rays will not pass entirely through the film and, consequently, when the film is developed a portion of the thickness thereof at the bottom side thereof will wash off making the film thinner.

After the screen has been subjected to the developing operation, the design portion 2a of the screen will be open-meshed so that printing material will readily pass therethrough. However, all the other portions of the screen will have the mesh closed by the gelatin film.

Figure 15:
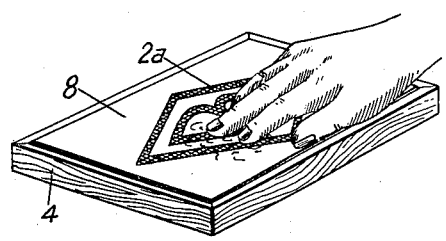
Figure 15 is a diagrammatic view illustrating how a substance may be applied to the gelatin film for keeping it moist and from becoming brittle and weak.

In order to prevent the gelatin on the screen from becoming weak and brittle I preferably treat it with glycerin or some other hygroscopic substance. This may be done as illustrated in Figure 15 by placing the finger tips in glycerin and then applying it to both sides of the gelatin film. This will keep a certain amount of moisture in the film. The thickness of the gelatin film may also be adjusted to a certain extent by using more or less glycerin. Since the gelatin film will be kept moist, it will always be flexible and soft and will not become brittle.

Figure 16:
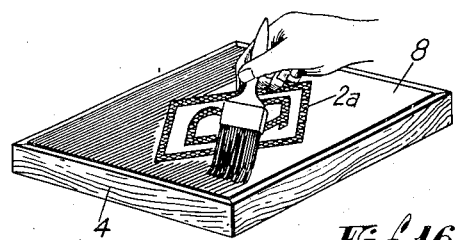
Figure 16 is a diagrammatic view illustrating how both sides of the screen stencil may be covered with lacquer or varnish throughout the desired areas to render the stencil more lasting.

The screen is then preferably covered on both sides with about three coats of lacquer as illustrated in Figure 16 in order to make it more durable. The lacquer is applied all around the design portion of the screen stencil. Also, the lacquer will fill the mesh of the screen around the margin of the film. If desired, the film need only be slightly larger than the design and any portions of the screen which it does not cover may be covered with lacquer.

Figure 17:
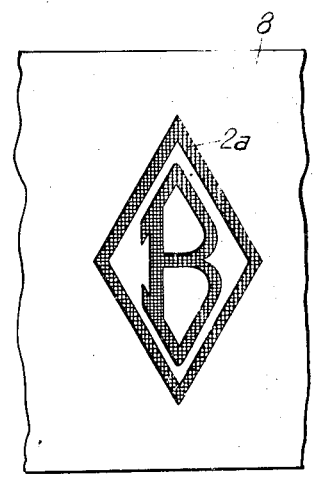
Figure 17 is a plan view of a portion of the screen stencil illustrating that the mesh of the screen within the design area is open so that printing material may readily pass therethrough.

It will be apparent from Figure 17 that the stencil produced will have the mesh of the design portion 2a thereof open so that paint or other printing material will readily pass therethrough. However, the mesh of the other portions of the screen will be closed so that the paint or printing material will not pass therethrough.

Figure 18:
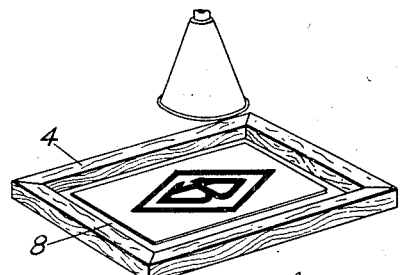
Figure 18 is a diagrammatic view illustrating a step in a method slightly different from my preferred method.

Although I have found that it is very desirable to subject the silk screen to the treatment which makes the threads translucent, this operation may be eliminated, if desired. However, if this operation is eliminated, as illustrated in Figure 18, when the film is exposed, the light is preferably shined through the screen from the squeegee side thereof. Thus, the light rays will be more intense on the squeegee side of the film and, consequently, the film on that side of the screen will be more effectively hardened than the opposite side. Since the most wear is on the squeegee side of the screen, due to the wiping action of the squeegee, the film on that side of the screen must be strong and durable. If the screen is developed in this manner, the desired result will be obtained. However, I preferably use the method wherein the threads of the screen are made translucent in order that the film on both sides of the screen will be properly hardened. In using this modified method, all the other steps remain the same as in the preferred form.

It will be apparent from the above description that I have provided a method of making screen stencils having many desirable features. The method which I have devised is very simple and may be easily and efficiently performed. By using the photogravure tissue in order to apply the gelatin film to the screen, instead of painting the gelatin on the screen, the method is greatly simplified. Furthermore, by using my method, the screen stencils produced will be of such a nature that they will be very sturdy and will withstand wear.

Many other advantages will be readily apparent.

Having thus described my invention, what I claim is:

1. The method of making screen stencils which comprises providing a suitably backed film of material capable of being sensitized and developed into ink-permeable and ink-impermeable portions and further capable of merging with the screen, placing the film carried by the backing in contact with the screen, causing the strands of the screen to become embedded in the film, removing the backing from the film, then exposing the film after it has been sensitized through a light stencil to light rays, and then developing the film.

2. The method of making screen stencils which comprises providing a suitably backed film of material capable of being sensitized and developed into ink-permeable and ink-impermeable portions and capable of merging with the screen, placing the film carried by the backing in contact with the screen, causing the film to adhere to the screen, removing the backing from the film, then exposing the film after it has been sensitized through a light stencil to light rays, and then developing the film.

3. The method of making screen stencils which comprises providing a gelatin film capable of being sensitized on a flexible backing, placing the gelatin film carried by the backing in contact with the screen, causing the strands of the screen to become embedded in the gelatin film by subjecting the film to treatment which causes it to become soft, sensitizing the gelatin film, removing the backing from the film, exposing the sensitized film through a light stencil to light rays, and then developing the film.

4. The method of making cloth screen stencils which comprises treating a cloth screen with a substance which makes the strands thereof translucent, providing a suitably backed film of material capable of being sensitized and developed into ink-permeable and ink-impermeable portions and capable of merging with the screen, placing the film carried by the backing in contact with the screen, causing the film to adhere to the screen, sensitizing the film, removing the backing from the film, exposing the sensitized film through a light stencil to light rays, and then developing the film.

5. The method of making cloth screen stencils which comprises treating a cloth screen with a substance which makes the strands thereof translucent, applying to the screen a film of material capable of being sensitized and developed into ink-permeable and ink-impermeable portions and capable of merging with the screen, exposing the sensitized film through a light stencil to light rays, and then developing the film.

6. The method of making cloth screen stencils which comprises treating a cloth screen with a substance which makes the strands thereof translucent, providing a gelatin film capable of being sensitized on a suitable backing, placing the film carried by the backing in contact with the screen, causing the strands of the screen to become embedded in the gelatin film by subjecting the film to treatment which causes it to become soft, sensitizing the gelatin film, removing the backing from the film, exposing the sensitized film through a light stencil to light rays, and then developing the film.

7. The method of making cloth screen stencils which comprises treating a cloth screen with a substance such as Canada balsam which makes the strands thereof translucent, providing a gelatin film capable of being sensitized on a suitable flexible backing, placing the film carried by the backing in contact with the screen, causing the strands of the screen to become embedded in the gelatin film by subjecting the film carried by the backing to a steaming and ironing process, sensitizing the gelatin film, removing the backing from the film, exposing the sensitized film through a light stencil to light rays, and then developing the film.

8. The method of making screen stencils which comprises providing a gelatin film capable of being sensitized on a suitable flexible backing, placing the film carried by the backing in contact with the screen, causing the strands of the screen to become embedded in the gelatin film by subjecting the film carried by the backing to a steaming and ironing process, sensitizing the gelatin film, removing the backing from the film, exposing the sensitized film through a light stencil to light rays, and then developing the film.

9. The method of making cloth screen stencils for use in screen stencil and squeegee printing operations which comprises treating a cloth screen with a substance which makes the strands thereof translucent, providing a flexibly backed film of material capable of being sensitized and developed into ink-permeable and ink-impermeable portions and capable of merging with the screen, placing the film carried by the backing in contact with the screen, causing the strands of the screen to become embedded in the film, sensitizing the film, removing the backing from the film, exposing the sensitized film through a light stencil to light rays emitted from a source at the work side of the screen, and then developing the film.

10. The method of making screen stencils for use in screen stencil and squeegee printing operations which comprises providing a gelatin film capable of being sensitized on a flexible backing, placing the gelatin film carried by the backing in contact with the screen, causing the strands of the screen to become embedded in the gelatin film by subjecting the film to treatment which causes it to become soft, sensitizing the gelatin film, removing the backing from the film, exposing the sensitized film through a light stencil to light rays emitted from a source at the squeegee side of the screen, and then developing the film.

11. The method of making screen stencils for use in screen stencil and squeegee printing operations, which comprises providing a gelatin film capable of being sensitized on a flexible backing, placing the gelatin film carried by the backing in contact with the screen, causing the strands of the screen to become embedded in the gelatin film by subjecting the film to treatment which causes it to become soft, sensitizing the gelatin film, removing the backing from the film, placing a ferrotype tin plate in contact with the film for a suitable period, removing the plate and exposing the sensitized film through a light stencil to light rays, and then developing the film.

12. The method of making screen stencils for use in screen stencil and squeegee printing operations which comprises providing a gelatin film capable of being sensitized on a flexible backing, placing the gelatin film carried by the backing in contact with the screen, causing the strands of the screen to become embedded in the gelatin film by subjecting the film to treatment which causes it to become soft, sensitizing the gelatin film, removing the backing from the film, exposing the sensitized film through a light stencil to light rays, developing the film, and then treating the film with a hygroscopic substance.

13. The method of making cloth screen stencils for use in screen stencil and squeegee printing operations which comprises treating a cloth screen with Canada balsam which makes the strands thereof translucent, providing a gelatin film capable of being sensitized on a suitable flexible backing, placing the film carried by the backing in contact with the screen, causing the strands of the screen to become embedded in the gelatin film by subjecting the film to treatment which causes it to become soft, sensitizing the gelatin film, removing the backing from the film, placing a ferrotype tin plate in contact with the film on the work side of the screen for a suitable period, removing the plate, exposing the film through a light stencil to light rays emitted from a source at the work side of the screen, and then developing the film.

14. The method of making a cloth screen stencil which comprises treating a cloth screen with Canada balsam to make the strands thereof translucent, embedding the screen in a film of sensitized material capable of being developed into ink-permeable and ink-impermeable portions and capable of merging with the screen, then exposing the sensitized film through a light stencil to light rays, and then developing the film.

WILLIAM D. BELL.